Patented Nov. 6, 1945

2,388,446

UNITED STATES PATENT OFFICE 2,388,446

METHOD FOR MANUFACTURE OF CERAMIC WARES

Halver R. Straight, Adel, Iowa

No Drawing. Application May 31, 1941,
Serial No. 396,167

14 Claims. (Cl. 106—72)

This invention relates to the manufacture of ceramic wares and pertains particularly to the preparation of ceramic material from which articles are to be formed by pressure, as by extrusion through a die, pressing in a mold, or otherwise.

The present application is a continuation in part of my copending application for Method of improving ceramic wares, Serial No. 242,193, filed November 25, 1938.

For convenience and brevity I employ the term "clay" in this specification and in the appended claims as a general designation for any and all mineral mixtures adapted or adaptable to be made into ceramic wares which are bonded by firing. Thus it is to be understood as referring to artificial mixtures of minerals for such uses and to naturally occurring materials such as shales and loess of suitable character, as well as to kaolin and the various natural materials to which the term is ordinarily applied in a more specific scientific sense. Likewise, I use the term "ceramic ware" to designate any and all articles or objects which may be made from such ceramic material by forming and firing, and the term "ceramic unit" as a designation for any such article formed from ceramic material as, for example, a brick, a building tile, a sewer tile, an electrical insulator, an article of household ware, etc. Inasmuch as the physical condition referred to as the "plasticity" of clay involves a quality of coherence or tenaciousness in the material and at the same time a characteristic which permits its form to be altered or molded by pressure more or less readily, I employ the term "plastic strength" herein to designate the first mentioned quality, and the term "plastic mobility" to designate the latter mentioned characteristic.

The present invention has for one of its objects the reduction of the amount of power required for the forming of ceramic units by manufacturing operations such as extrusion through a die, pressing in a mold, etc., and for the preparation of clay in a condition suitable for such forming.

Another object of the invention is to effect a reduction in the amount and intensity of the strains and stresses which are set up in ceramic units incident to their drying after shaping and in the course of firing and subsequent cooling, thus to reduce the losses from breakage and warping.

Another object of the invention is to reduce the proportion of shrinkage occurring in ceramic units incident to their drying preliminary to firing and also the amount of shrinkage which occurs in the course of or subsequent to firing.

Yet another object is to obtain, in the preparation of the clay mass, a uniform distribution of those ingredients or constituents of the mass which are more or less soluble in water and which contribute desired characteristics to the finished ceramic unit, and to reduce and retard the migration of such constituents or ingredients to the surface of the unit in the course of the drying thereof, or the gathering or concentration of those ingredients at the surface or in localized portions of the unit. The improvement in these particulars is for the purpose of reducing the strains or stresses developed in or as between different portions of the ceramic unit during firing and cooling, as well as to obtain greater uniformity in the structural constitution of the ceramic unit and likewise greater and more uniform strength.

Still another object is to obtain closer association and more extensive contact as between the particles of the clay in the course of the preparation of it and in the course of the fabrication of ceramic units from it and particularly incident to the shaping of such units by pressure, and, by so doing, to obtain increased strength and uniformity in the finished units and increased density if desired.

Other objects of the invention and other advantages or new or improved results obtained by it in the finished ware and in the manufacturing procedure will be pointed out or indicated hereinafter or will be apparent to one skilled in the art upon a complete understanding of my process and its effects.

Described generally, my invention comprises a process of preparing clay which is to be used for the formation of ceramic wares, and consists in intimately and uniformly mixing with the clay in the presence of water, a relatively small quantity of an acid which has in its molecular structure a carboxyl group in addition to its alkyl group, as exemplified in the fatty acids, a relatively small quantity of a liquid hydrocarbon mixture, and an alkalizing material in amount suitable to alkalize the water in the presence of the other components of the mass.

As the alkalizing agent, I prefer to use soda ash because it is readily soluble in water at ordinary temperature, readily obtainable, economical, and easily handled and measured in automatic feeding apparatus. While various liquids which contain hydrocarbons are susceptible of use, I prefer kerosene because it has a comparatively short chain of hydrocarbon atoms, is not easily exploded, is low in sulfur and low in cost. Likewise, there are numerous carboxyl acids which may be employed in the process with varying degrees of effectiveness, but of them I prefer to us oleic acid because of its availability and low cost and because it is only slightly corrosive and is liquid at ordinary temperatures and hence may be handled and worked with convenience.

The molecules of acids of the carboxyl class have the capacity of being wetted by alkaline water under proper temperature conditions to form soap reactions in which liquid hydrocarbon mixtures, such as petroleum distillates, are diffusible to form an emulsion. By forming such a mixture of a carboxyl acid, alkaline water and hydrocarbon liquid and adding it to a mixture containing water-soluble metal compounds such as are usually found in ceramic clays (calcium carbonate, magnesium carbonate, calcium sulfate, magnesium sulfate, for example), a hydrated colloidal emulsion will be formed, which emulsion is very stable. It appears that such an emulsion has a high affinity for the silicates of ceramic clays by polar adsorption forces, so that upon intimate contact, soap films of substantially monomoleuclar thickness are spread over the surfaces of the silicate particles and a very thin film of water is held between such soap films and said surfaces. Because of the characteristics of this emulsion, a very thorough distribution of it and effective filming of the clay particles throughout the entire clay mass may be obtained by mixing and working procedure of kinds ordinarily followed in the preparation of ceramic clays for extrusion. The soap films which are thus applied to the particles carry the hydrocarbon liquid diffused in or on them and function as a lubricant between the surfaces of the particles in the working of the clay mass and in the forming of ceramic units from it.

Moreover, since the water film is retained between the carboxyl ends of the acid molecules and the surfaces of the particles, the metallic compounds or salts present in the liquid or precipitated therein will be retained or trapped between the surfaces of the particles and the adsorbed soap films. Thus, in addition to obtaining thorough distribution of the lubricating agents and the metallic compounds upon the surfaces of the clay particles throughout the mass, the soap films are effective thereafter to retain the metallic compounds in such distributed association with the particles during the forming of a ceramic unit from the mass. Furthermore, these metallic compounds are maintained in this distributed condition during the drying of the formed unit and are held against migration to the outer surfaces of the unit while the water is gradually drawn to its air-exposed surfaces and evaporated.

These metallic compounds are, as a matter of fact, fluxes, and because of the uniform distribution of them which is accomplished and maintained as above described, a desirable uniformity of vitrification or glass bond formation is obtained in the ware upon firing. This may be availed of to obtain increased strength and density in the finished ware. Moreover, the various factors referred to above may be availed of to benefit the physical characteristics of the finished ware in other particulars.

Because ceramic clays vary so greatly in constitution and structural character, it is not feasible to specify particular proportions or amounts of these treating materials which will obtain best results in all instances. However, for clays commonly used for the making of heavy ceramic wares such as building brick, paving brick, building tile, sewer tile, heavy electrical insulators and the like, I find that highly beneficial results are obtained by using the materials in proportions as small as one pound of soda ash, one-fourth pound of oleic acid and one-half pound of kerosene, per ton of finished ware. The amount of water employed is merely that necessary to permit the mass to be worked into a plastic condition suitable for extrusion or molding under pressure. Part of such water may be present in the clay to begin with or all or part of the water may be added to the clay in the course of its preparation. By way of general directions, it may be stated that the alkali should be in a proportion sufficient to alkalize the water in the presence of the other components of mixture, the acid in a proportion adequate to react for a quantity of soaps sufficient to film the clay particles fairly completely with monomolecular film, and the hydrocarbon liquid in quantity sufficient to contribute appreciable lubricating effect throughout the clay mass. Accordingly, for a clay in which the amount of soluble metal compounds is relatively high or the average grain size relatively small, a higher proportion of the acid will be required to obtain sufficient soaps to film the particles to the same extent than will be necessary for a clay in which the proportion of soluble metal compounds is relatively low or the average grain size relatively large. Likewise, a clay in which relatively small particles predominate will require a higher proportion of the hydrocarbon liquid to obtain commensurate lubricating effect than will one in which the average grain size is relatively large, and a clay in which the particles are sharp or angular will require a higher proportion of the hydrocarbon liquid than one in which the grains are round or smooth. Within limits, the use of the hydrocarbon liquid permits substantial reduction in the amount of water required for the working of the mass to the desired condition of plasticity, and I have found that in various common brick or tile clays one pound of kerosene, as used in my process, will effectively take the place of several pounds of water for the purpose of such working. I attribute this not merely to the lubricating quality of the kerosene itself, but more particularly to the facts that a thinner and more uniform and thorough distribution of the filming materials and a more tenaciaus adherence of the films to the particles are obtained by my process. Use of the treating materials in excessive amounts or proportions may produce undesirable effects. For example, an excessive amount of alkali in the mixture has a deflocculating and disruptive effect which decreases the plastic strength of the mass. Use of an excessive amount of hydrocarbon liquid likewise results in a decrease of the plastic strength.

In the practice of the process, for best results and most economical operation, it is desirable first to alkalize the water with the soda ash, sodium hydroxide or other soluble alkali, and separately mix the hydrocarbon liquid with the acid—they being fully miscible—and then mix the hydrocarbon-acid mixture with the alkaline water. The mixing of the hydrocarbon-acid mixture with the alkaline water may be accomplished effectively by violent agitation. The mixing of the various ingredients may be accomplished at room temperature if the acid is one which is liquid at that temperature. If the acid is one which is solid at room temperature, as is stearic acid for example, it and the water may be heated sufficiently to melt it if rapid mixing is desired. The liquid mixture formed as above described is added to the clay, and the whole worked into the desired plastic condition by plugging or other suitable procedure. For most uniform results, I find that the liquid mixture should be applied to the clay by spraying it under pressure in the form of a fine mist.

It is to be understood, however, that while I prefer the mixing procedure just described, the invention is not limited to that particular mode of operation, as commensurate results may be obtained by admixing the alkalizing material with the clay before the addition of the acid and hydrocarbon liquid and either with or before the addition of part or all of such water as it may be necessary to add to obtain the desired plasticity.

Among the beneficial results which are obtained by the use of my method, perhaps those first noticeable are a reduction in the amount of power necessary for the working of the mass into a condition suitable for extrusion or moulding, and likewise a reduction in the amount of power required to extrude it through a die or shape it by pressing in a mould. This power saving results, in the first place, from the internal lubrication of the mass by the very thin films on the particles, which permits the solid particles to be moved more readily and rapidly relative to one another and into intimate association with one another both in the working of the mass and in the forming of it into the desired shapes; and, in the second place, from the external or surface lubrication of the mass which facilitates passage of the material through the extrusion die or its slipping on the mould surfaces and into close conformation therewith.

I find that the saving which may be effected in these particulars by use of my method may be very substantial. The amount of this saving may be closely estimated by comparison of the working temperature rise in material prepared in accordance with my method with the rise which takes place in a mass prepared by the ordinary procedure from the same ceramic clay and with the same mechanical equipment. This temperature rise is measured between the point where the various materials of the batch, including the clay, are first brought together for mixing, and the point where the extruded material has just left the extrusion die. The intervening rise in the temperature of the material is a close indication of the amount of work or power which has been expended upon it in the operations of mixing and working it into plastic condition and extruding it.

I find that in working with a clay of a character suitable for manufacture of hollow building tile and the like, and which has a fairly smooth grain of medium size, this rise in temperature is from 7° to 10° F. less when my method is employed than it is when the ordinary procedure of clay preparation is followed, the same apparatus being used in both instances and the materials being extruded at the same rate of flow through the die. If the clay is of coarse or sharp grain, the difference in temperature rise as between the two procedures is still greater.

I have referred above to the reduction which my method permits in the amount of water used in the clay. This enables the formed units to be dried more rapidly and at the same time with less drying shrinkage and less likelihood of producing drying strains and cracks. Such reduction in the amount of water also contributes to an increase in the density and strength of the completed unit.

I have also referred above to the improvements in vitrification, density and strength of the finished ware that result from the uniform distribution of the flux components that is attained by my method and maintained as a result thereof during the drying and firing. In addition to those improvements I find that my method contributes a further advantage in enabling vitrification, or formation of the crude glass band, to start at a considerably lower temperature than that at which it starts in a similar unit made in accordance with the customary procedure. This not only shortens the firing period, thereby effecting saving in fuel and time, but also results in the production of finished ware of closer structure and greater strength. The retention of the flux constituents against migration within the body of the formed unit or to its surface in the course of the drying and firing, contributes to uniformity of strength and structure, and integrity and uniformity of surface finish as well.

Most or all of these advantages are obtained by the use of my method in the manufacture of ceramic units of porous character as well as those of close grain structure. Porous ware is customarily made by including in the clay a suitable proportion of calcined coarse-ground particles, in order to produce an open structure. The use of my process in the manufacture of such ware obtains stronger bonding of the particles upon firing, and this is of particular importance in view of the relatively few contact points afforded by the constituent particles in porous ware of this type.

A particular advantage of my method resides in the fact that these several important results may be obtained by use of the treating materials in such small amounts or proportions that neither the plastic strength of the mixture when in condition for extruding nor the strength or coherence of the material in the dried condition of a unit before firing is perceptibly impaired.

The method and procedure as described above constitute the subject matter of my copending application above identified. As mentioned above in reference to the quantities of treating materials used, there are points above which any increase in the amount or proportion of them is of no benefit and may have detrimental effect. These points vary, of course, with the character of the clay which is being used. For example, I find that in a representative brick clay of fairly smooth, medium size grain the addition of kerosene beyond a proportion of 1¼ pounds per ton of clay results in no appreciable benefit, and, in some particulars, will be of disadvantage.

Since the filing of the aforesaid application, however, I have ascertained that the effectiveness of the process may be appreciably increased by the use, in conjunction with the other materials referred to above, of a small proportion of steam distilled pine oil. This material may be used in very much smaller proportion than the others. For example, if the clay is one in which the proportion of kerosene to be added for best results would be in a ratio of one pound per ton of finished ware, I find that appreciable betterment will result from an addition of steam distilled pine oil in the ratio of one pound to fifty tons of finished ware. For most convenient operation, the pine oil is incorporated in the hydrocarbon-acid mixture preliminary to the admixing of the latter with the alkalized water, as the pine oil is fully miscible in the hydrocarbon-acid mixture.

As demonstrative of the benefits obtainable by use of this very small amount of pine oil in the process, I have found, by the temperature differential test explained above, that with the use of pine oil the temperature rise is reduced as much as 1° F. from the rise which normally occurs where the other materials are used in the same kind of clay and procedure but without the pine oil. It seems quite evident that this is not due merely to a mechanical lubricating action of the pine oil, as the quantity used is too small for any appreciable effect of that kind. I attribute the result to possible influence of the pine oil in augmenting the wetting effect between the emulsion films and the clay particles, thereby facilitating the mixing, and also increasing the strength of the film and the attraction between it and the particles, thereby heightening the lubricating effect of the emulsion films. I find, furthermore, that use of the pine oil as explained has further beneficial effect in expediting the drying of the interior portions of a formed unit, with the result that the drying proceeds more uniformly in both the interior and surface portions of the unit and the possibility of drying strains and surface cracks is thereby greatly reduced.

What I claim is:

1. In the manufacture of ceramic ware, a method of preparing clay for the forming of ceramic articles which comprises intimately mixing with ceramic clay in the presence of water, an alkali, a hydrocarbon oil and a fatty acid, the alkali being in quantity sufficient to alkalize the water in the presence of the other constituents, the acid being in an amount and of a kind to produce a soap reaction with the alkalized water, and the hydrocarbon oil being of a kind which is miscible with the acid and of an amount that is emulsifiable in the liquid mixture, the aggregate liquids being in such proportion to the clay solids as to form a plastic mass suitable for shaping into ceramic units by pressure.

2. In the manufacture of ceramic ware, a method which comprises mixing with ceramic clay in the presence of water, an alkali, a hydrocarbon oil and a fatty acid, the alkali being in quantity sufficient to alkalize the water in the presence of the other constituents of the mixture, the acid being in an amount and of a kind to produce a soap reaction with the alkalized water, and the hydrocarbon oil being of a kind which is miscible with the acid and in an amount that is emulsifiable in the liquid mixture, the aggregate liquids being in such proportion to the clay solids as to form a plastic mass; working the admixed materials to a plastic condition, shaping a ceramic unit from the plastic mixture, drying the unit, and firing the unit.

3. In the preparation of clay for manufacture of ceramic ware, a method which comprises producing in the presence of the clay solids a wetting emulsion comprising a mixture of a hydrocarbon oil with the reaction products of a fatty acid and alkaline water, intimately admixing the emulsion with the clay to an extent such as to wet substantially all of the clay particles; the hydrocarbon oil being of a kind miscible with the acid, the acid being of a kind which is diffusible in the alkaline water, and the total quantity of liquid being adequate for mixture with the clay solids to form a coherent plastic mass.

4. In the preparation of clay for manufacture of ceramic ware, a method which comprises forming a reaction-emulsion of kerosene and oleic acid with alkaline water, the acid being of a kind which is diffusible in the alkaline water, admixing with the clay a quantity of said emulsion sufficient to film a substantial proportion of its particles, and working the mixture into a coherent plastic mass suitable to be shaped by extrusion to form ceramic units.

5. In the preparation of clay for manufacture of ceramic ware, a method as specified in claim 3 and wherein the quantity of hydrocarbon oil used does not materially exceed that which is emulsifiable in the mixture of other liquids present.

6. In the preparation of clay for manufacture of ceramic ware, a method which comprises mixing with the clay, in the presence of water, an alkali in quantity sufficient to alkalize the water, a higher fatty acid which is diffusible in the alkaline water, and a hydrocarbon oil which is miscible with the fatty acid, the fatty acid and hydrocarbon oil being limited to amounts which are substantially emulsifiable in the alkalized water present, and the aggregate of liquids present being limited to a quantity which may be mixed with the clay solids to form a coherent plastic mass; and working the mixture into a plastic mass which will maintain its shape in the absence of extraneous pressure.

7. In the manufacture of ceramic ware, a process of preparing clay for the forming of ceramic units which comprises admixing with the clay, in the presence of water, an alkali, a fatty acid and a distillate of petroleum which is miscible with the acid, the alkali being in quantity sufficient to alkalize the water in the presence of the other components of the mixture, the acid being one which is diffusible in the alkalized water and the quantity of petroleum distillate being approximately that which is emulsifiable in the other liquids present; and working the mixture sufficiently to distribute the liquid mixture substantially uniformly upon the solid particles of the clay and to convert the mixture into a coherent plastic mass.

8. In the preparation of clay for the formation of ceramic units, a method which comprises mixing with the clay a quantity of kerosene, fatty acid with which the kerosene is miscible, water, and alkali sufficient to alkalize the water in the presence of the other constituents of the mixture; the liquids being in proportion to the clay solids such as to form with them a coherent plastic mass when the liquids are distributed substantially uniformly among them; and working the mixture into a coherent plastic condition.

9. In the preparation of clay for the forming of ceramic units, a method which comprises mixing with the clay an alkali and a quantity of liquid materials such as to form a coherent plastic mass when the liquids are distributed substantially uniformly among the solid particles of the clay; said liquids comprising oleic acid, kerosene and water; the alkali being in quantity to alkalize the water in the presence of the other constituents and the acid and kerosene being in quantity and proportions such as to form an emulsion with the alkalized water.

10. The treatment of clay for production of building blocks, which consists in thoroughly mixing with brick clay one pound of soda ash, one-fourth pound of oleic acid, and one-half pound kerosene per ton of the clay, together with water in quantity sufficient to give the mass suitable plasticity to permit its being molded into building blocks by tile forming machines.

11. The treatment of clay for production of ceramic ware, which consists of mixing with ceramic clay a mixture consisting of soda ash, oleic acid and kerosene in substantially the following proportions per ton of clay: one pound of soda ash, one pound of oleic acid and one-half pound of kerosene, together with such amount of water in addition to the added liquids and the amount of water already in the clay as is necessary to plasticize the mass, said ingredients being violently mixed together and being applied to the clay while it is being plasticized.

12. In the manufacture of ceramic units, a method which comprises mixing with ceramic clay, in the presence of water, an alkali, a fatty acid, a petroleum distillate and pine oil; the alkali being in quantity sufficient to alkalize the water in the presence of the other substances, the acid being of a kind and in an amount diffusible in the alkalized water, the petroleum distillate being miscible with the acid and in an amount substantially emulsifiable in the other liquids, the pine oil being in amount adequate to increase the apparent wetting affinity of the liquid mixture for the clay particles, and the aggregate liquids and clay solids being in such proportion as to form a coherent plastic mass when uniformly admixed; and working the materials together to effect a substantially uniform wetting of the solid particles with the liquids and form a coherent plastic mass.

13. In the manufacture of ceramic units, a method as specified in claim 12 and including the additional step of extruding portions of the plastic mass to shape said portions for ceramic units.

14. The treatment of ceramic clay for production of building blocks and the like which consists in thoroughly mixing, with one ton of ceramic clay, one-half pound of kerosene, one-fourth pound of a higher fatty acid, such additional amount of water as may be requisite for plasticizing the mass, and a sufficient amount of an alkalizer to cause the pH of the mixture to lie between the limits 7.5 and 8.5, and working the mixture to a state of plasticity.

HALVER R. STRAIGHT.